United States Patent
Gao

(10) Patent No.: US 11,614,783 B2
(45) Date of Patent: Mar. 28, 2023

(54) METHOD AND SYSTEM FOR PROVIDING POWER FROM A UTILITY POWER SOURCE OR A PHOTOVOLTAIC (PV) SYSTEM TO INFORMATION TECHNOLOGY

(71) Applicant: Baidu USA LLC, Sunnyvale, CA (US)

(72) Inventor: Tianyi Gao, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 114 days.

(21) Appl. No.: 17/131,189

(22) Filed: Dec. 22, 2020

(65) Prior Publication Data

US 2022/0197357 A1    Jun. 23, 2022

(51) Int. Cl.
  *G06F 1/26*    (2006.01)
(52) U.S. Cl.
  CPC .......... *G06F 1/263* (2013.01); *H02J 2300/24* (2020.01)
(58) Field of Classification Search
  CPC ........ G06F 1/263; H02J 2300/24; H02J 3/381
  USPC ........................................................ 713/300
  See application file for complete search history.

(56) References Cited

U.S. PATENT DOCUMENTS

| | | | | |
|---|---|---|---|---|
| 11,320,893 B2* | 5/2022 | Liu | .................. | G06Q 50/06 |
| 2013/0212410 A1* | 8/2013 | Li | ..................... | G06F 1/263 |
| | | | | 713/300 |
| 2015/0074431 A1* | 3/2015 | Nguyen | ............. | G06F 1/30 |
| | | | | 713/300 |
| 2016/0109916 A1* | 4/2016 | Li | ..................... | H02J 7/35 |
| | | | | 700/295 |
| 2017/0005515 A1* | 1/2017 | Sanders | ........... | G05B 15/02 |
| | | | | 713/300 |
| 2018/0052431 A1* | 2/2018 | Shaikh | ............ | H02J 3/46 |
| 2018/0116070 A1* | 4/2018 | Broadbent | ....... | H02J 4/00 |
| 2020/0089307 A1* | 3/2020 | McNamara | ..... | G06F 1/3234 |

* cited by examiner

*Primary Examiner* — Chun Cao
(74) *Attorney, Agent, or Firm* — Womble Bond Dickinson (US) LLP

(57) ABSTRACT

According to one embodiment, an Information Technology (IT) power system for a data center. The system includes a utility power source, an IT cluster that includes a several pieces of IT equipment. The cluster is coupled to the source and is configured to draw power from the source and provide the drawn power to the pieces of IT equipment. The system also includes a photovoltaic (PV) system that includes a PV panel that is arranged to convert solar radiation into direct current (DC) power. It also may include a voltage sensor and a controller that are configured to decouple the cluster from the source and to couple the cluster to the PV system such that the cluster draws the DC power directly from the PV panel when the output voltage of the PV panel sensed by the voltage sensor exceeds a threshold value.

18 Claims, 10 Drawing Sheets

METHOD AND SYSTEM FOR PROVIDING POWER FROM A UTILITY POWER SOURCE OR A PHOTOVOLTAIC (PV) SYSTEM TO INFORMATION TECHNOLOGY

FIELD

Embodiments of the present disclosure relate generally to an information technology (IT) power system with a photovoltaic (PV) system for a data center.

BACKGROUND

Large clusters of computer servers can be kept in dedicated facilities (e.g., data centers), often in a rack enclosure. These dedicated facilities require a considerable amount of power, which is drawn from a utility (e.g., alternating current (AC) mains). Along with needing power to operate the clusters of computer servers, the facilities also draw power to maintain a well regulated environment (e.g., through the use of a computer room air conditioning (CRAC) unit). Drawing such a large amount of power from the AC mains increases the overall cost of operating a facility and increases the facility's carbon footprint.

To decrease dependency on the AC mains and reduce a carbon footprint, some facilities are turning to renewable power systems, such as a photovoltaic (PV) system. FIG. 1 illustrates an example of a PV system 100. This system includes a PV panel 101, an inverter/charger 102, a load 103, and one or more batteries 104. During operation, the PV panel 101 converts solar radiation into electrical direct current (DC) power. The inverter/charger 102 (e.g., which may be separate components) converts the DC power into AC power that is used to power the load 103. In the case of dedicated facilities, the load may be any electrical component, such as a computer server. Along with (or in lieu of) powering the load, the inverter/charger may charge the batteries 104 to store the energy produced by the solar panel to be used later to power the load. For instance, at night the inverter may draw energy from the batteries 104 to power the facility's components.

Implementing a PV system, such as system 100 illustrated in FIG. 1 for a data center has many drawbacks. In particular, the PV system 100 can be expensive and significantly increase the complexity of the implementation of the facility. For example, such a PV system that includes several batteries will increase complexity due to the extra components required for maintaining (e.g., charging/discharging) the batteries. In addition, the incorporation of batteries will increase the overall cost of operating and implementing a PV system (e.g., due to having a considerable amount of batteries in order to store enough energy to run the data center).

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
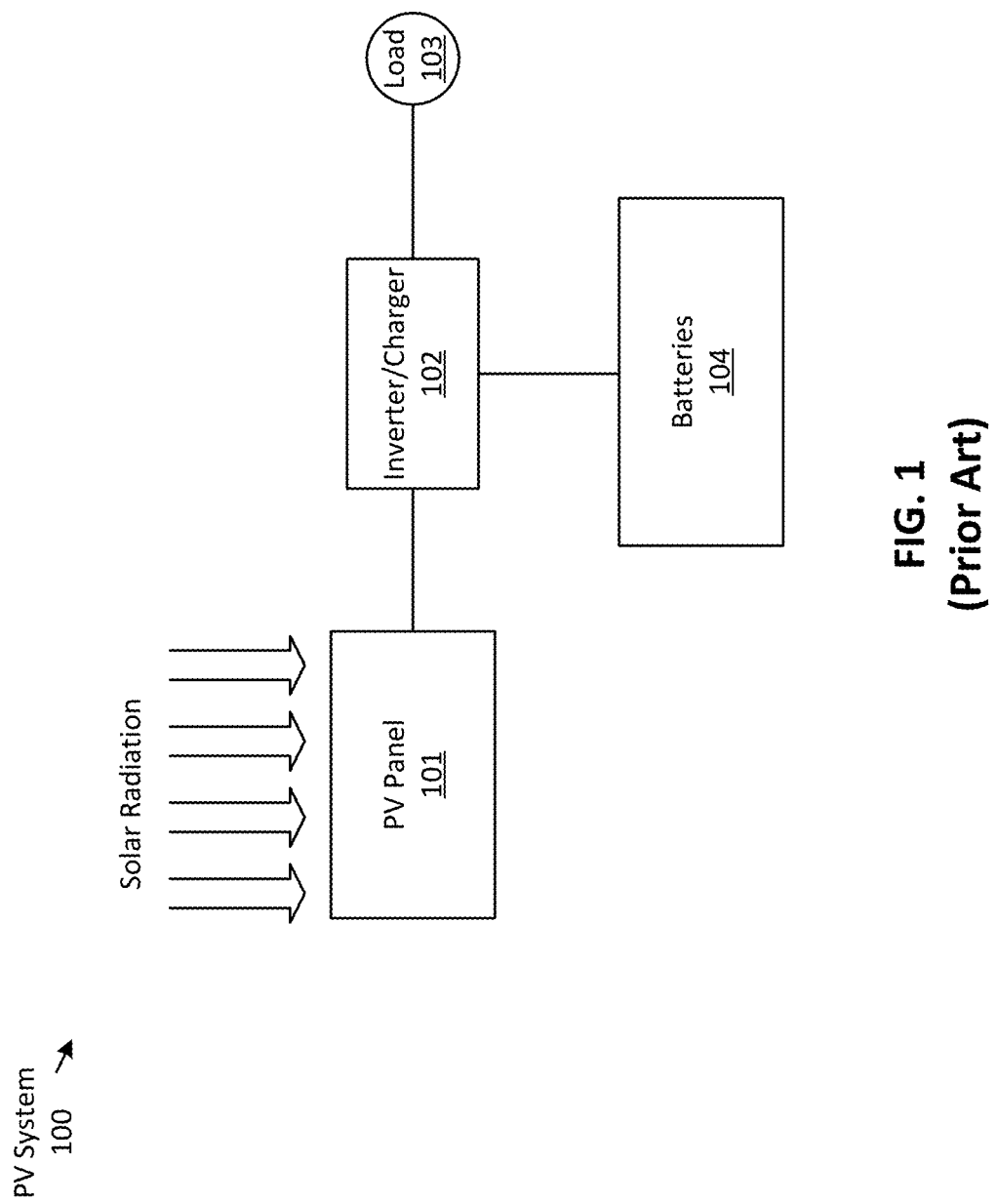
FIG. 1 is a block diagram of an example of a photovoltaic (PV) system that includes a battery.

Several embodiments of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As described herein, a switch is configured to be "open" (or off) when there is no continuity between one terminal and another terminal (e.g., an input contact and an output contact) of the switch, which does not allow electric current to flow through the switch. In contrast, a switch is configured to be "closed" (or on) when there is continuity between the two terminals of the switch, which allows the electric current to flow through the switch. In one embodiment, a switch may be a bidirectional switch, which allows a two-way bidirectional flow of current when on, based on the polarity of the two terminals of the switch. In one embodiment, a switch as described herein may have one or more terminals.

The present disclose solves the problem of reducing cost (e.g., component cost, operating cost, service/maintenance cost, etc.) and complexity of implementing a photovoltaic (PV) system in a data center by eliminating (or removing)

the need for batteries. The solution proposed in the current disclosure provides an information technology (IT) power system for a data center that includes a PV system with a PV panel from which solar power is (e.g., directly) drawn (e.g., not drawn from a battery) to power IT equipment within an IT cluster. Specifically, the IT cluster is coupled to a utility power source (e.g., alternating current (AC) mains) and is configured to provide utility power drawn from the source to the IT equipment. A controller is configured to decouple the IT cluster from the utility power source and to couple the IT cluster to the PV system such that the IT cluster draws power from the PV panel when an output voltage of the PV panel exceeds a threshold voltage. For instance, the threshold voltage may be based on at least IT cluster characteristics (e.g., current power requirements for operating the IT equipment of the IT cluster, etc.). Otherwise, the IT cluster may remain coupled to the utility power source only. As another feature, the DC power produced by the PV panels may be provided to the IT cluster in excess of the utility power. In other words, the controller may be configured to couple both power sources, the utility power source and the PV panel, to the IT cluster to provide power. As a result, along with lowering the Total Cost of Ownership (TCO) by reducing the number of components necessary to operate a PV system, the present disclosure efficiently manages and regulates power requirements for the IT cluster under different operating conditions of its IT equipment.

According to one embodiment, an Information Technology (IT) power system for a data center, the IT power system including a utility power source; an IT cluster that includes a several pieces of IT equipment, at least one of the pieces of IT equipment including one or more servers to provide data processing services, wherein the IT cluster is coupled to the utility power source and is configured to draw utility power from the utility power source and provide the drawn utility power to the pieces of IT equipment; a photovoltaic (PV) system that includes a PV panel that is arranged to convert solar radiation into direct current (DC) power; and a controller that is configured to decouple the IT cluster from the utility power source and to couple the IT cluster to the PV system such that the IT cluster draws the DC power from the PV panel when an output voltage of the PV panel exceeds a threshold voltage.

In one embodiment, the PV system further includes a voltage sensor that is coupled to the PV panel and a switch that is coupled between the voltage sensor and the IT cluster, wherein the voltage sensor is arranged to sense the output voltage of the PV panel as an open-circuit voltage of the PV panel while the PV system is not coupled with any load when the switch is open. In some embodiments, the switch is a first switch, wherein the PV system further includes a second switch that is coupled between the first switch and the IT cluster; and a DC-to-DC converter that is coupled between the first switch and the second switch and is configured to convert the output voltage of the PV panel into an output voltage of the DC-to-DC converter, wherein, in response to the output voltage of the PV panel exceeding the threshold voltage, the first switch and second switch are configured to close such that the output voltage of the DC-to-DC converter is input to the IT cluster.

In one embodiment, the PV system further includes a PV controller that is configured to receive the sensed output voltage of the PV panel from the voltage sensor, and in response to determining that the sensed output voltage of the PV panel exceeds the threshold voltage, close the first switch, and transmit a control signal to the controller indicating that the output voltage of the PV panel exceeds the threshold voltage, wherein the controller closes second switch in response to receiving the control signal from the PV controller. In another embodiment, the DC-to-DC converter is a first DC-to-DC converter, wherein the PV system further includes a second DC-to-DC converter that is coupled between the first switch and the first DC-to-DC converter, wherein the second DC-to-DC converter is configured to convert the output voltage of the PV panel into an output voltage of the second DC-to-DC converter that is input to the first DC-to-DC converter and with which the first DC-to-DC converter is configured to convert into the output voltage of the first DC-to-DC converter. This may improve the system design efficiency and component selection flexibilities under some circumstances. In some embodiments, the PV panel is a first PV panel and the voltage sensor is a first voltage sensor, wherein the PV system further includes a second PV panel; a second voltage sensor that is coupled to the second PV panel; a third switch that is coupled to the second voltage sensor, wherein the second voltage sensor is configured to sense an output voltage of the second PV panel as an open-circuit voltage while the PV panel is not coupled with any load when the third switch is open; a third DC-to-DC converter that is coupled to the third switch and is configured to convert the output voltage of the second PV panel into an output voltage of the third DC-to-DC converter; and a DC bus that couples the second and third DC-to-DC converters in parallel to the first DC-to-DC converter, wherein, in response to both open-circuit voltages of the first and second PV panels exceeding the threshold voltage, the first switch, the second switch, and the third switch are configured to close. In one embodiment, the PV system is a first PV system, wherein the IT power system further includes a second PV system that has a same arrangement of components as the first PV system; and a DC bus that couples the first PV system and the second PV system in parallel to the IT cluster which is configured to draw DC power from either or both of the PV systems.

In one embodiment, the PV system does not include a battery from which the IT cluster may draw stored DC power converted by the PV panel. In another embodiment, the IT power system further includes a DC bus to which the PV system and IT cluster are coupled; a first switch that is coupled between the utility power source and the IT cluster; a second switch that is coupled between the IT cluster and the DC bus; and a third switch that is coupled between the PV system and the DC bus, wherein the first switch is closed and the second and third switches are open while the IT cluster draws utility power from the utility power source, wherein the controller decouples the IT cluster from the utility power source and couples the IT cluster to the PV system by opening the first switch and closing the second and third switches.

According to another embodiment, a data center includes a data center IT room and an IT power system, as previously described.

According to another embodiment, a method performed by a programmed processor of an IT power system for a data center, the IT power system including a PV system that has a PV panel that is arranged to convert solar radiation into DC power. The method includes providing utility power from a utility power source to an IT cluster that includes a plurality of pieces of IT equipment; determining that an output voltage of the PV panel exceeds a threshold voltage; and in response to determining that the output voltage exceeds the threshold voltage, providing the DC power from the PV panel to the IT cluster. In one embodiment, the method determines the threshold voltage based on PV system characteristics and IT cluster characteristics. In some embodiments, the PV system has a voltage sensor that is coupled to the PV panel and a switch that is coupled between the voltage sensor and the IT cluster, wherein the method further includes receiving, from the voltage sensor, a measurement of the output voltage as an open-circuit voltage of the PV panel while the PV system is not coupled with any load when the switch is open. In one embodiment, the IT power system has 1) a second switch that is coupled between the utility power source and the IT cluster and 2) a third switch that is coupled between the PV system and the IT cluster, wherein providing the DC power includes closing the first switch and the third switch while the second switch is open. In another embodiment, the PV system does not include a battery from which the IT cluster may draw stored DC power converted by the PV panel.

Figure 2:
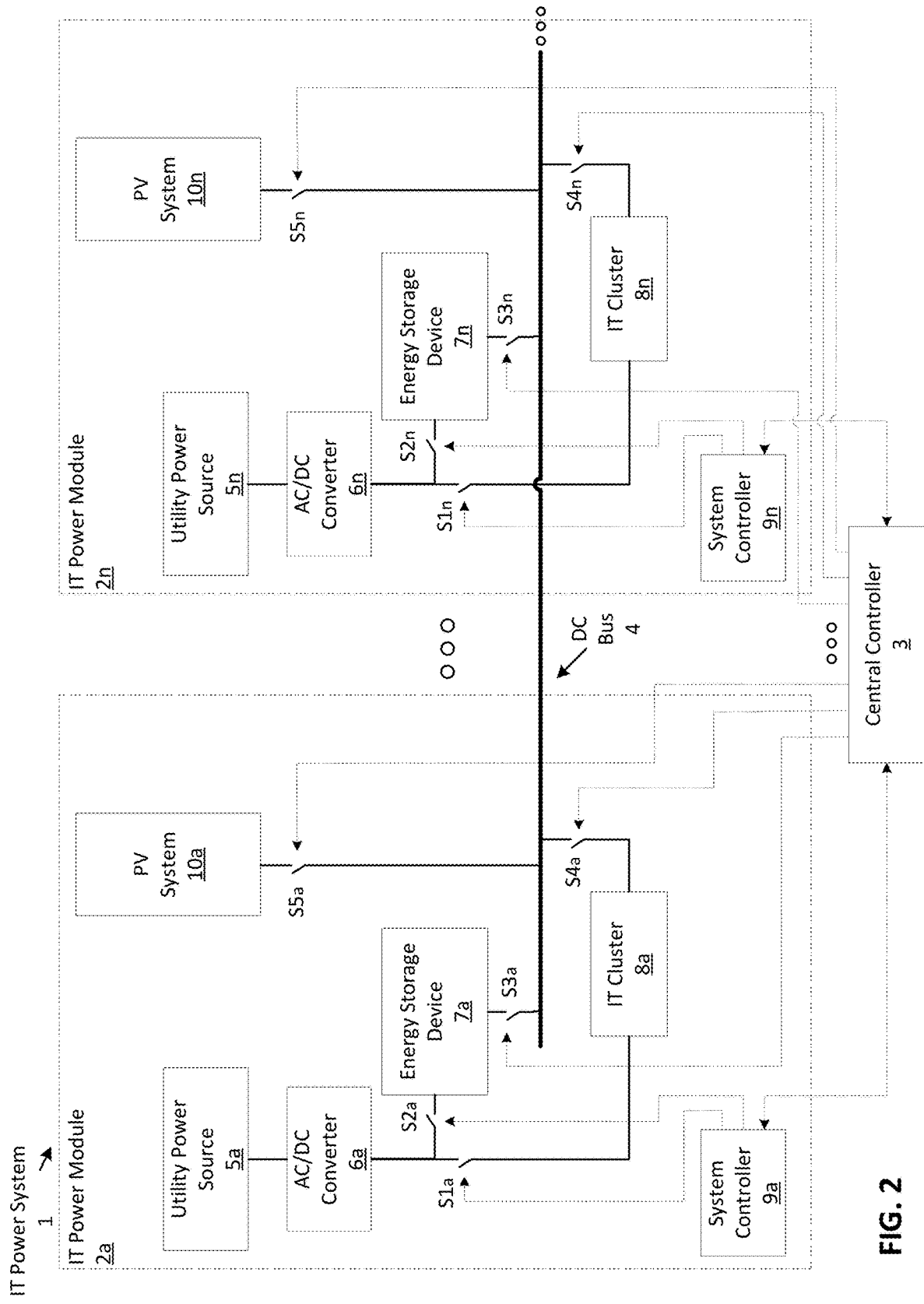
FIG. 2 is a block diagram illustrating an example of an information technology (IT) power system according to one embodiment.

FIG. 2 is a block diagram illustrating an example of an IT power system 1 according to one embodiment. Specifically, this figure shows the IT power system 1 that may be implemented in a data center in order to power (e.g., one or more pieces of IT equipment of) one or more IT clusters using solar power produced by one or more PV systems that do not include batteries from which the solar power may be drawn. More about the PV systems is described herein. The IT power system includes one or more IT power modules 2a-2n, a DC bus 4, and a central controller 3. The DC bus 4 (or DC busbar) may be a power rail or power bus that is coupled to one or more components within each (or at least some) of the IT power modules 2a-2n to distribute DC power from one or more DC power sources (e.g., PV systems 10a-10n, as described herein) to the components (e.g., IT clusters). In one embodiment, the DC bus may be any electronic component that may distribute power, such as a metallic strip, bar, or wire. In some embodiments, the DC bus may include connection ports that allow components to be connected to or disconnected from the bus.

The central controller 3 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In one embodiment, the controller may be a circuit with a combination of analog elements (e.g., resistors, capacitors, inductors, etc.) and/or digital elements (e.g., logic-based elements, such as transistors, etc.). The controller may also include memory. In one embodiment, the central controller 3 may be configured to perform one or more operations described herein for providing solar power from one or more PV systems to one or more IT clusters. For example, the controller may be configured to execute a machine learning (ML) algorithm that has operations to determine how and when to provide solar power, utility power, stored energy, or a combination thereof to the IT clusters. More about the central controller is described herein.

The IT power module 2a includes one or more power sources including a utility power source 5a, an energy storage device 7a, and a PV system 10a. In one embodiment, the power module is arranged to provide power from one or more of the sources to one or more loads at any given time. The module 2a also includes other electronic components such as a AC-to-DC converter 6a, an IT cluster 8a, and a system controller 9a. In one embodiment, the power module may include more or less elements (or components), such as having one or more IT clusters. As another example, the power module may not include an energy storage device 7a.

As illustrated, the IT power system 1 may include one or more power modules, as illustrated by having modules 2a through 2n. In one embodiment, each of the modules may be configured to power a respective IT cluster and/or one or more IT clusters of other IT power modules via the DC bus 4 to which each of the modules is coupled. More about the power modules being coupled to the DC bus 4 is described herein. In one embodiment, each of the IT power modules may be configured similarly to one another. For example, as shown, the power module 2n includes the same (e.g., number of) components in the same configuration as module 2a. In another embodiment, however, at least some of the power modules (e.g., module 2n) may include different components (and/or different number of components), which may be in a different (or same) configuration as shown in module 2a.

The utility power source 5a may be any type of power source that is designed to provide AC power, such as the AC mains or a generator. In one embodiment, the utility power source may include a DC power source (e.g., a battery, a DC bus, etc.) coupled to a power inverter that is designed to convert DC power back into AC power. In one embodiment, the utility power source is a main power source from which one or more components within the IT power module (e.g., the IT cluster) draws power. The AC-to-DC converter (or inverter) 6a is (e.g., electrically) coupled to the utility power source 5a, and is arranged to receive AC power from the source. The AC-to-DC converter is configured to convert AC power to DC power by converting AC voltage supplied by the utility power source into a DC voltage. In one embodiment, the AC-to-DC converter may be any type of converter, such as a buck, a boost, or a flyback converter. In some embodiments, the utility power source path which is illustrated as only having the source 5a, the converter 6a, and the switch $S1_a$, may include one or more additional electronic components that enable the facility power system to provide utility power to the IT cluster.

The IT cluster 8a may include one or more pieces of IT equipment (e.g., one or more servers that provide data processing services). In one embodiment, the IT cluster may include (or be a part of) an electronic rack that includes the IT equipment, such as rack 500 illustrated in FIG. 8. In another embodiment, the IT cluster may include IT equipment that is a part of one or more electronic racks. As shown, the IT cluster is coupled to the utility power source via the AC-to-DC converter. The IT cluster is configured to draw utility power from the utility power source that is converted into DC power by the converter 6a, and is configured to provide the drawn utility power to the cluster's one or more pieces of IT equipment. The IT cluster is also coupled to the DC bus 4, and is configured to draw power from the DC bus, as described herein.

Figure 3A:
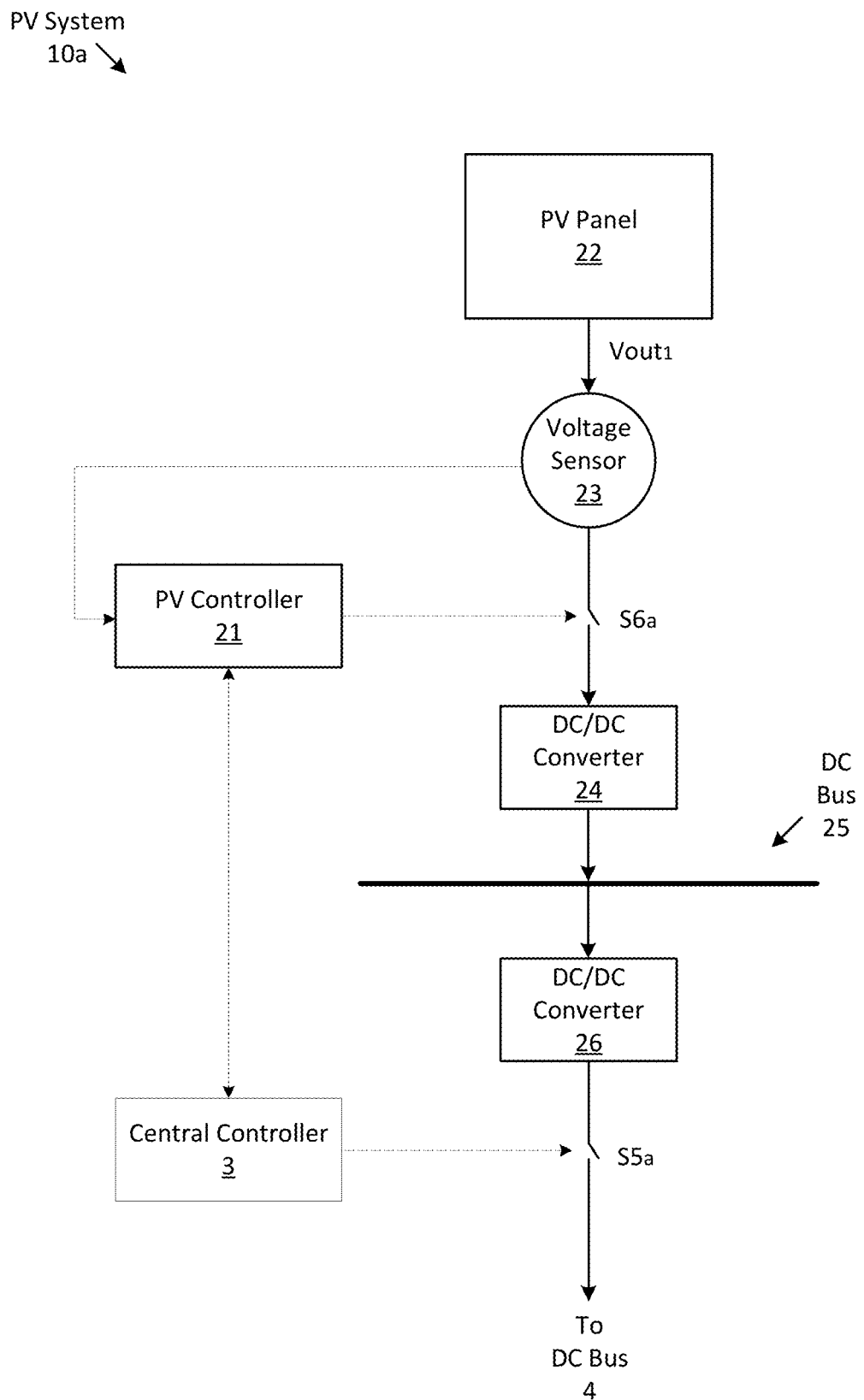
FIG. 3a shows an example of a PV system, which does not include a battery, and is not providing direct current (DC) power to a DC bus according to one embodiment.
Figure 3B:
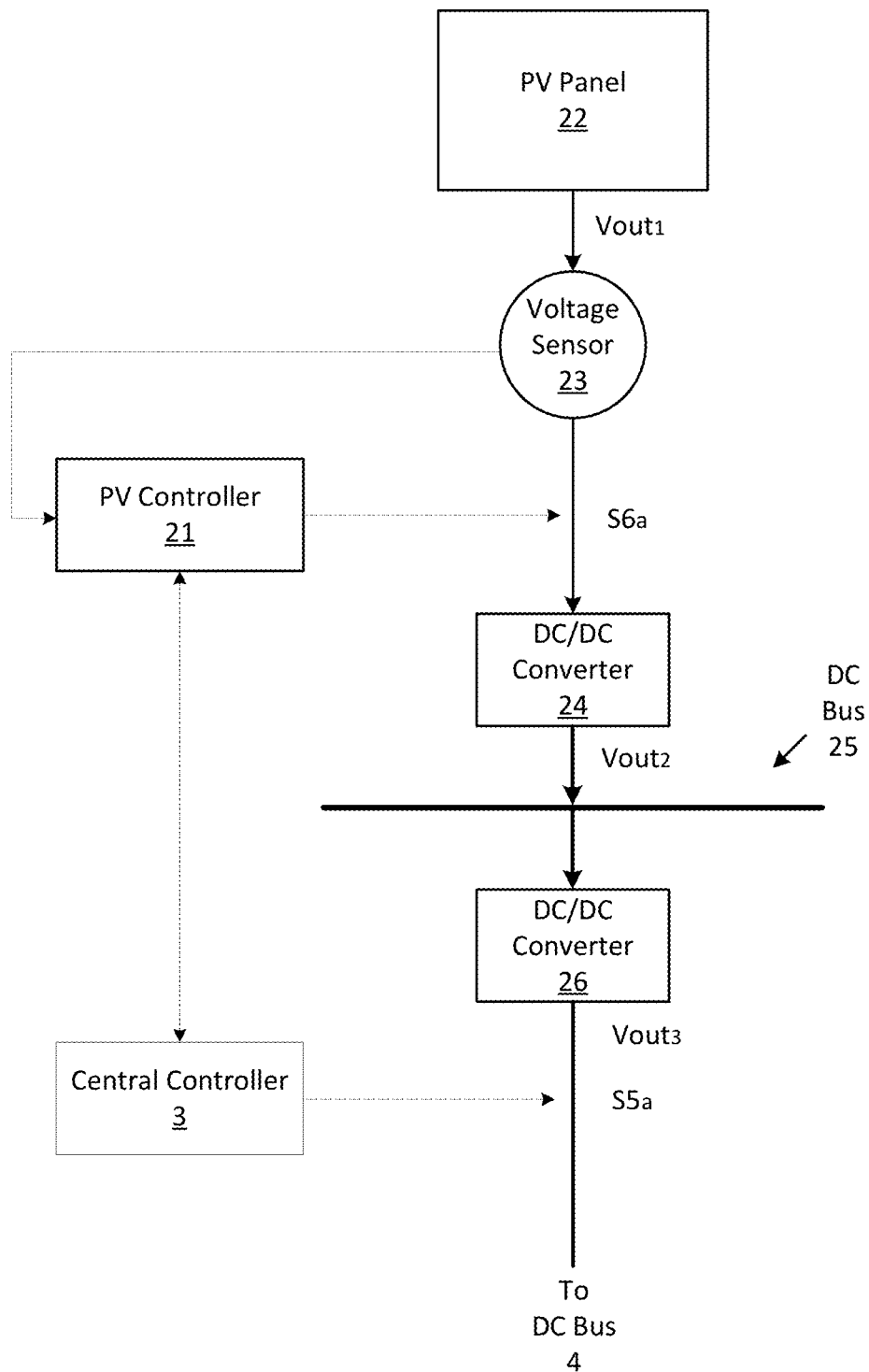
FIG. 3b shows an example of the PV system providing DC power to the DC bus according to one embodiment.

In one embodiment, although the components in this figure are illustrated as separate blocks, at least some may be integrated with one another. For example, the AC-to-DC converter 6a and/or the energy storage device 7a may be located in the IT cluster. In this case, both components may be a part of (or integrated within) one or more racks (such as rack 500) that are a part of the IT cluster. As another example, $S5_a$ may be a part of the PV system 10a, as illustrated in FIGS. 3a and 3b.

The PV system 10a is configured to produce DC power that is converted from solar radiation, and provide the power to the DC bus 4. More about the PV system is described herein. The energy storage device 7a is coupled to the AC-to-DC converter 6a, and is coupled to the DC bus 4. In one embodiment, the energy storage device may be any type of device that is configured to store and discharge energy, such as an uninterruptible power supply (UPS), one or more batteries, etc. Thus, the storage device may include one or more rechargeable energy storage devices.

As illustrated, the IT power module 2a includes several switches $S1_a$-$S5_a$. In one embodiment, the switches (or relays) may be any type of (e.g., power) switches that allows (e.g., DC) current to flow (e.g., between two terminals of the switch) when closed and prevents current from flowing when open. As shown, $S1_a$ is coupled (e.g., disposed) between the AC-to-DC converter 6a and the IT cluster 8a; $S2_a$ is coupled between the AC-to-DC converter and the energy storage device 7a; $S3_a$ is coupled between the energy storage device and the DC bus 4; $S4_a$ is coupled between the IT cluster 8a and the DC bus 4; and $S5_a$ is coupled between the PV system 10a and the DC bus 4. In one embodiment, the IT power module 2a may include more or less switches as those described herein. In another embodiment, each of the switches is "coupled (or disposed) between" two electronic components such that one terminal of the switch is coupled to one of the electronic components and another terminal of the switch is coupled to the other electronic component, such that when opened current may flow between the components and when closed current is prevented from flowing between the components.

In one embodiment, each of the switches $S1_a$-$S5_a$ is configured to open or close according to one or more control signals received from one or more controllers (or any electronic devices) that are communicatively coupled (e.g., via a wired connection using any communication protocol, such as System Management Bus (SMBus)) with the switch. For instance, the IT power module 2a includes a system controller 9a that is (at least) communicatively coupled with $S1_a$ and $S2_a$, while the central controller 3 is (at least) communicatively coupled with $S3_a$, $S4_a$, and $S5_a$. In one embodiment, either of the controllers may be communicatively coupled with more or less switches. For instance, the central controller may be communicatively coupled with all five switches of the IT power module 2a. In one embodiment, the IT power module 2a may not include a system controller, which as a result the central controller may communicate with each of the switches within the module. In some embodiments, one or more of the controllers may be communicatively coupled via a wireless connection with one or more of the switches in order to transmit the control signals.

In some embodiments, the IT power system 1 may operate in one of several configurations in order to provide power to one or more IT clusters. Specifically, the central controller is configured to couple the IT cluster 8a of the IT power module 2a to one or more power sources. In a first configuration, the central controller 3 is configured to provide utility power from utility power source 5a to IT cluster 8a by connecting the utility power source 5a to the IT cluster and disconnecting other power sources, such as the PV system 10a. For instance, to provide utility power, the central controller is configured to open $S4_a$ (and open $S5_a$ and/or open $S3_a$) and instruct (e.g., via a control signal transmitted to) the system controller 9a to close $S1_a$. In a second configuration, the control controller 3 is configured to provide power from PV system 10a to the IT cluster by connecting the PV system to the IT cluster and disconnecting other power sources, such as the utility power source 5a. In this configuration, the central controller is configured to close $S4_a$ and $S5_a$; and is configured to instruct the system controller 9a to open $S1_a$. In a third configuration, the central controller 3 may be configured to provide power from the energy storage device 7a to the IT cluster. For instance, the central controller may be configured to open $S5_a$, close $S3_a$ and $S4_a$; and may be configured to instruct the system controller 9a to open $S1_a$ and/or $S2_a$. In one scenario, $S2_a$ may close for charging the storage device 7a. In some embodiments, other configurations are capable in which the central controller (and/or the system controller) powers the IT cluster from one or more of the power sources described herein.

In one embodiment, in any of these configurations, the energy storage device 7a may be coupled or decoupled from the DC bus 4 and/or the AC-to-DC converter 6a. In particular, while in at least some of the configurations the system controller 9a may open $S2_a$ and the central controller may open $S3_a$ in order to electronically isolate the storage device from the AC-to-DC converter 6a, and from the DC bus 4. In another embodiment, the storage device may be coupled to one or more of the electrical components in order to discharge energy and power one or more components. For example, to power the IT cluster 8a, $S2_a$ (and/or $S5_a$) may be opened, while $S3_a$ (and $S4_a$) are closed. To charge the storage device 7a, utility power may be used by closing $S2_a$ and opening $S3_a$. In one embodiment, power drawn from the PV system 10a may be used to charge the storage device by opening $S2_a$ and closing $S3_a$ (and $S5_a$).

Some of the configurations described herein relate to providing power to one or more IT clusters from one power source, such as from the utility power source. In another embodiment, however, power may be provided to one or more IT clusters from one or more power sources. For example, along with providing utility power from the utility power source (e.g., while $S1_a$ is closed), the IT power system 1 may also provide the IT cluster power from the DC bus 4 (and from the PV system 10a). In this case, $S1_a$ and $S4_a$ (and $S5_a$) may be closed to provide power from several sources. This allows the IT cluster to draw some power from the utility power source, while supplementing power that would otherwise be drawn from the utility power source from the (e.g., PV system 10a that is providing power to the) DC bus 4.

In another embodiment, the central controller 3 may be configured to perform operations to determine whether one or more power sources of one or more IT power modules are to be coupled to one or more IT clusters in order to provide power. Specifically, the central controller 3 may determine whether an IT cluster (e.g., IT cluster 8a) is to draw utility power or power from one or more PV systems (such as its respective PV system 10a) based on one or more criteria. For instance, the central controller 3 may determine one or more IT cluster characteristics, such as an operating power level for the IT cluster 8a (e.g., a requirement for powering the IT cluster's one or more pieces of IT equipment). In one embodiment, the central controller may communicate with the system controller 9a and/or the IT cluster 8a to determine the cluster's characteristics. In some embodiments, the central controller may determine one or more PV system characteristics of the PV system 10a. For example, the central controller may determine an output voltage (e.g., an open-circuit voltage) across one or more PV panels of the PV system, and from the output voltage determine whether the PV system may provide sufficient power to operate the IT cluster in lieu of (and/or in addition to) the utility power source. More about the operations performed by the central controller 3 is described herein.

FIGS. 3a and 3b show an example of a PV system that does not include a battery according to one embodiment. Specifically, each of these figures show PV system 10a (e.g., of IT power module 2a) that includes a PV panel 22, a voltage sensor 23, a DC bus 25, and two DC-to-DC converters 24 and 26. In one embodiment, the PV system illustrated in these figures may be the same in each of the IT power modules 2a-2n of the IT power system 1. In another embodiment, however, at least some of the PV systems may be different. For instance, a PV system may include more or less components, such as having two or more PV panels. In another embodiment, the PV system may only include one DC-to-DC converter. The PV system also includes switches, $S6_a$ and $S5_a$. As shown, each of these components are arranged (coupled) in series. Specifically, the voltage sensor is coupled to the PV panel, and switch $S6_a$ is coupled after the voltage sensor (e.g., between the sensor and the IT cluster). $S6_a$ is then coupled to the DC-to-DC converter 24, which is coupled to the DC-to-DC converter 26 via the DC bus 25. In one embodiment, the DC-to-DC converter 24 may be coupled directly to the DC-to-DC converter 26, in which case the PV system may not include DC bus 25. The DC-to-DC converter 26 is coupled to the DC bus 4 via the switch $S5_a$. In one embodiment, the PV system includes the two switches in order to isolate the PV panel 22 and the converters 24 and 26 to avoid high voltage damage. In another embodiment, the PV system may include additional switches, such as having a switch coupled between the PV panel and the voltage sensor. Such a switch may be opened when the PV panel needs to be replaced or serviced in order to ensure that the remainder of the components are isolated.

The PV panel 22 is arranged to convert solar radiation into DC power. The voltage sensor 23 is arranged to sense an output (e.g., DC) voltage of the PV panel ($Vout_1$). In one embodiment, the voltage sensor is arranged to sense an open-circuit voltage of the PV panel while the (e.g., PV panel of the) PV system is not coupled with any load (e.g., any IT cluster) when switch $S6_a$ is open. In some embodiments, the voltage sensor may be any type of sensor that is designed to sense an output voltage. The PV controller 21 is communicatively coupled to the switch $S6_a$, the voltage sensor and the central controller 3. The PV controller is configured to receive (e.g., measure) sensed output voltage of the PV panel from the voltage sensor, and is configured to open/close $S6_a$ based on the output voltage, as described herein. More about the PV controller is described herein. Both DC-to-DC converters 24 and 26 are configured to convert an input (e.g., a respective input) DC voltage into an output (e.g., a respective) DC voltage. In one embodiment, the converters may each be any type of DC-to-DC converter, such as a buck converter, a boost converter, or a buck-boost converter. More about the DC-to-DC converters is described herein. More about the operations performed by the converters is described herein.

Returning to FIG. 3a, this figure illustrates that the (e.g., PV panel 22 of the) PV system 10a is isolated from the DC bus 4 and is not providing DC power the bus. Specifically, in this figure both $S6_a$ and $S5_a$ are in an open configuration. In one embodiment, this figure represents an arrangement of the PV system 10a in which the IT power system 1 is providing power to the IT cluster 8a from another source. For example, the IT power system 1 may be operating in the first configuration described herein in which the IT cluster 8a is drawing utility power from the utility power source 5a. In particular, the switches (or at least one of the switches) of the PV system may be opened based on $Vout_1$ being above a threshold voltage. More about the threshold voltage is described herein.

FIG. 3b shows an example of the PV system providing DC power to the DC bus according to one embodiment. Specifically, $S6_a$ has been closed by the PV controller 21 and $S5_a$ has been closed by the central controller 3. In one embodiment, this figure represents the arrangement of the PV system 10a, while the IT power system is operating in (at least) the second configuration described herein in which the IT cluster 8a is drawing power from the PV system. In another embodiment, the IT system may be drawing power from both power sources, as described herein. Thus, since the PV system does not include a battery from which stored DC power converted by the PV panel may be drawn, the IT cluster is drawing DC power (e.g., directly) from the PV panel.

As described herein, the PV system may be configured to provide power to the IT cluster 8a in response to $Vout_1$ of the PV panel exceeding (or meeting) a threshold voltage. As shown, the DC-to-DC converter 24 converts $Vout_1$ to an output voltage $Vout_2$, which may be lower or greater than $Vout_1$. In addition, the second DC-to-DC converter 26 is converts $Vout_2$ to $Vout_3$, which may be an operating voltage of the IT cluster. In one embodiment, the PV system includes two converters in order to normalize $Vout_1$ before it is converted into a desired DC voltage for the IT cluster (or more specifically a desired DC voltage of the DC bus 4). In one embodiment, $Vout_2$ may be different than $Vout_3$, which may allow one or more additional electronic components (not shown) to draw power from DC bus 25, where these components may operate at a different DC voltage than the $Vout_3$, which is across the DC bus 4 (and input to the IT cluster, as described herein).

Figure 4:
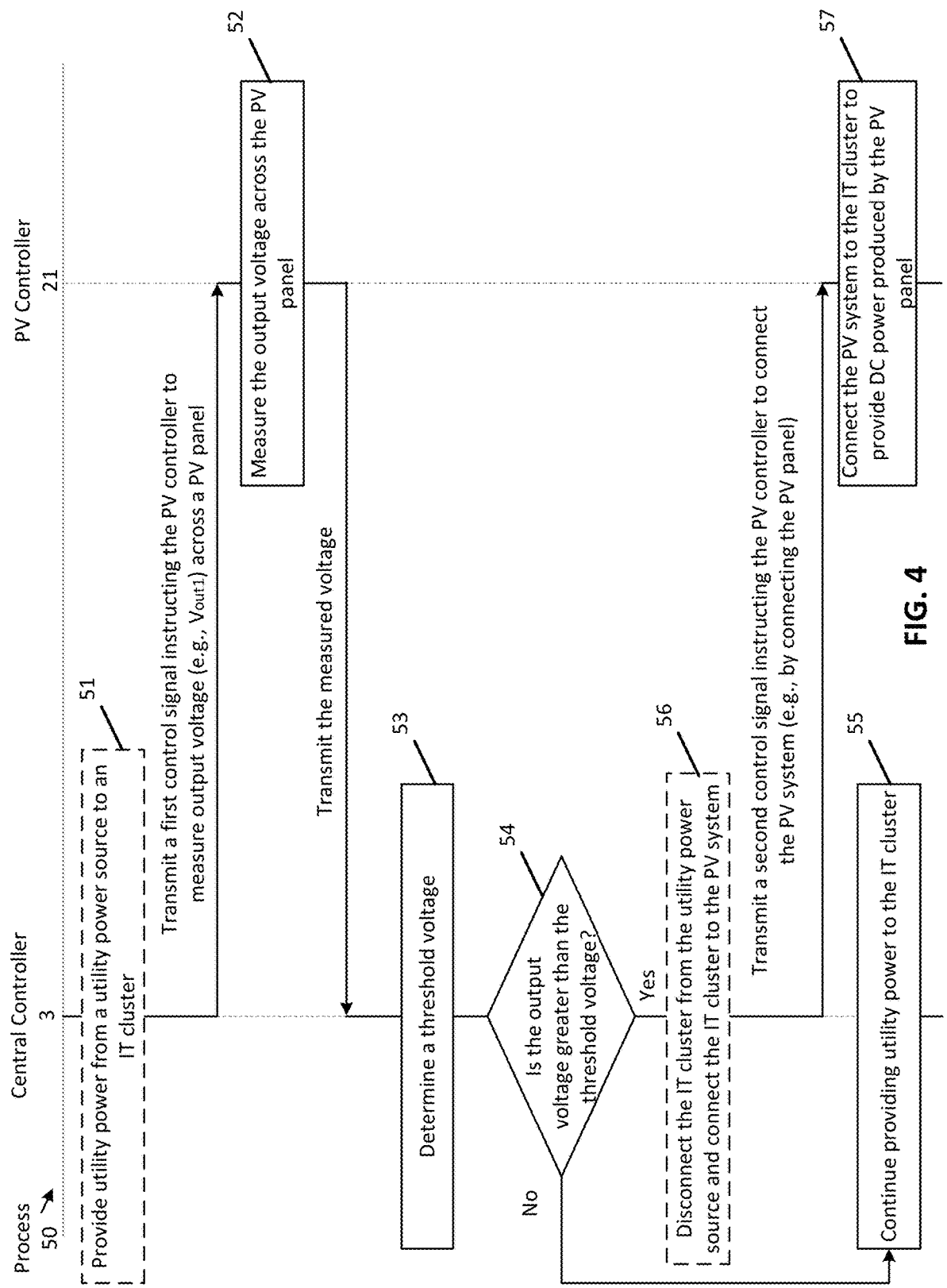
FIG. 4 is a signal diagram of a process performed by a central controller and a PV controller for providing DC power from a PV panel according to one embodiment.

FIG. 4 is a signal diagram of a process 50 performed by the central controller 3 and the PV controller 21 for providing DC power from the PV panel 22 to the IT cluster 8a (via the DC bus 4), according to one embodiment. For instance, this figure illustrates the operations performed by the controllers while the PV system 10a is not providing DC power, as illustrated in FIG. 3a. In one embodiment, these operations may be performed by controllers of one or more IT power modules 2a-2n and/or by the central controller. The process 50 begins by the central controller 3 providing utility power from the utility power source 5a to the IT cluster 8a that includes one or more pieces of IT equipment (at block 51). For instance, the central controller 3 (and the system controller 9a) may configure the IT power module in the first configuration described herein, in which $S1_a$ is closed and at least $S4_a$ is open. The central controller 3 transmits a first control signal to the PV controller 21, which instructs the PV controller to measure the output voltage, $Vout_1$, across PV panel 22. In one embodiment, the first control signal may activate or "wake up" the PV controller, which may be operating in a standby mode in order to conserve power.

The PV controller 21 measures the output voltage, $Vout_1$, across the PV panel (at block 52). Specifically, the PV controller receives the output voltage as an open-circuit voltage that is measured by the voltage sensor 23, while $S_a$ is open. The PV controller 21 transmits the measured output voltage to the central controller.

The central controller 3 determines a threshold voltage (at block 53). In one embodiment, the threshold voltage may be a predefined voltage value based on engineering calculation and characterizations. In another embodiment, the central controller determines the threshold voltage based on characteristics of the IT power system 1, such as PV system characteristics and/or IT cluster characteristics. As described herein, the central controller determines whether one or more IT clusters are to draw utility power, stored energy, power from one or more PV systems, or a combination thereof based on one or more criteria, which may include PV system and/or IT cluster characteristics. In one embodiment, the PV system characteristics may include a maximum power point (MPP), which is the maximum amount of power the panel may generate, a maximum current that may be provided by the panel, a fill factor that is a relationship between a maximum amount of DC power that may be provided by the panel under normal operating conditions, and an efficiency of the panel. In some embodiments, the threshold voltage may be based on open-circuit voltage (of the PV panel) and closed-circuit voltage relationship that is characterized based on the PV system and the IT load characteristics. For example, the open-circuit voltage of the PV panel may reflect the PV system characteristics and is used to calculate the (e.g., potential) power generation from the PV system. Thus, different PV systems with different components, such as different PV panels may have different open-circuit voltages.

In another embodiment, the PV system characteristics may also include characteristics of other components within the system, such as efficiency of the DC-to-DC converters 24 and 26, and internal resistances of the switches $S6_a$ and $S5_a$. In one embodiment, the PV system characteristics may also indicate whether additional electronic components are to draw power that is to be produced by the PV panel 22, such as components that may be electrically coupled to the DC bus 25 of the PV system. In some embodiments, the IT cluster characteristics may include the operating power level of the IT cluster, as described herein. As another example, the IT characteristics may also include other characteristics that may impact the overall power requirement of the IT cluster, such as power required for cooling the pieces of IT equipment. To determine the threshold voltage, the central controller may apply one or more characteristics as described herein as input into a predefined model that generates from the input the threshold voltage as output. As another example, the central controller may perform a table lookup using one or more of the characteristics into a lookup table that associates the characteristics with predefined threshold voltages.

The central controller 3 determines whether the output voltage, $Vout_1$, is greater than the threshold voltage (at decision block 54). In one embodiment, $Vout_1$ is an open-circuit voltage while $S6_a$ is open, as described herein. If not, the central controller continues to provide utility power to the IT cluster (at block 55). If, however, $Vout_1$ is greater than the threshold voltage, the central controller 3 disconnects the IT cluster from the utility power source and connects the IT cluster to the PV system (at block 56). Specifically, the central controller transmits a signal to the system controller 9a to open $S1_a$ (and $S2_a$), and the central controller closes $S4_a$ and $S5_a$ (and may open $S3_a$). The central controller 3 transmits a second control signal to the PV controller 21 instructing the controller to connect the PV system to the IT cluster. In response, the PV controller connects the PV system 10a to the IT cluster 8a to provide DC power produced by the PV panel to the cluster (at block 57). As described herein, the PV controller may close $S6_a$, thereby allowing solar energy to (e.g., directly) flow from the PV panel into the IT cluster 8a (e.g., through the DC bus 4).

In some embodiments, the controllers may adjust the configuration of the switches in any particular order. For instance, $S5_a$ may be closed by the central controller before $S6_a$ is closed by the PV controller. In this case, $S1_a$ may be opened before $S5_a$ and $S6_a$ are closed. Thus, the closing of $S5_a$ and $S6_a$ may be performed while $S1_a$ is open. In another embodiment, $S1_a$ may be opened before $S4_a$ is closed to electronically couple the IT cluster to the PV system via the DC bus 4. In another embodiment, the order in which the switches are closed may be performed differently, such as closing $S6_a$, $S5_a$, and then $S4_a$.

Some embodiments may perform variations to the processes described herein. For example, the specific operations of at least some of the processes may not be performed in the exact order shown and described. The specific operations may not be performed in one continuous series of operations and different specific operations may be performed in different embodiments. For example, at the beginning of the process 50 the IT cluster is being provided utility power. In another embodiment, the process may begin while the IT cluster is being provided DC power being produced by the PV panel (e.g., while the IT power system is in the second configuration, as described herein). In this case, in response to determining that the output voltage is not greater than the threshold voltage, which may be due to less favorable weather conditions (e.g., cloudy skies, or nighttime is approaching), the process may disconnect the PV panel from the IT cluster and connect the IT cluster to the utility power source. Specifically, once the PV system is connected to a load (e.g., the DC bus 4), the controller (e.g., the central controller and/or the PV controller) may be configured to detect the current power output based on a closed circuit voltage (e.g., while $S6_a$ is closed). As example, when the close circuit voltage drops, it means the power generated from the PV panel may not able to provide usable quality of power given the input DC requirement for converters 24 or 26. Thus, in determining that the output voltage, which is the closed-circuit voltage (due to the PV system providing power), the controller disconnects the IT cluster from the PV system by opening one or more switches of the PV system, such as $S5_a$ and/or $S6_a$ to cut the PV power. Otherwise, the PV system may continue providing DC power from the solar panel.

In another embodiment, at least some operations described in process 50 are optional operations, as illustrated by being dashed boxes. As a result, at least some of the operations may not be performed. For example, in response to determining that the output voltage is greater than the threshold voltage, the PV system may be connected such that the IT cluster is provided DC power produced by the PV system's PV panel and is provided utility DC power from the utility power source. As a result, the IT cluster may receive at least some power from both sources. This may allow the data center to draw less power from the utility, thereby enabling higher renewable power usage, reducing operating costs, and the center's carbon footprint.

As described herein, the central controller may perform one or more of the operations to power one or more IT clusters with one or more power sources. In this case, when multiple IT power modules, 2a-2n are coupled to the DC bus 4, the operations performed by the controllers may consider characteristics of those modules. For example, the determination of the threshold voltage may be based on whether one or more IT clusters are to be powered via the DC bus 4 and whether one or more PV systems may be used to provide (e.g., at least a portion) such power. Specifically, the determination may be based on IC cluster characteristics of the one or more IT clusters 8a-8n and the PV system characteristics of one or more PV systems 10a-10n. As a result, when the one or more PV systems output voltages' exceed the threshold voltage, the central controller may close their respective switches, and may connect the PV systems' respective IT clusters (and/or other IT clusters) to the DC bus 4. In some embodiments, the central controller may connect a set of PV systems to the DC bus 4, while only connecting a subset of IT clusters to the DC bus 4. This may occur when the PV systems are unable to produce enough power to power all respective IT clusters, but may be able to power at least some.

As described herein, some operations may be performed by one or more controllers, such as the system controller 9a, the PV controller 21, and/or the central controller 3. In one embodiment, however, some controllers may perform more or other operations than described herein. For instance, the PV controller may determine the threshold voltage. In another embodiment, all of the operations may be performed by one controller, such as the central controller 3. In this case, the central controller may be communicatively coupled all of the components of the PV system, such as $SS_a$, $S6_a$ and the voltage sensor 23 of the PV system 10a, as illustrated in FIG. 3a.

Figure 5:
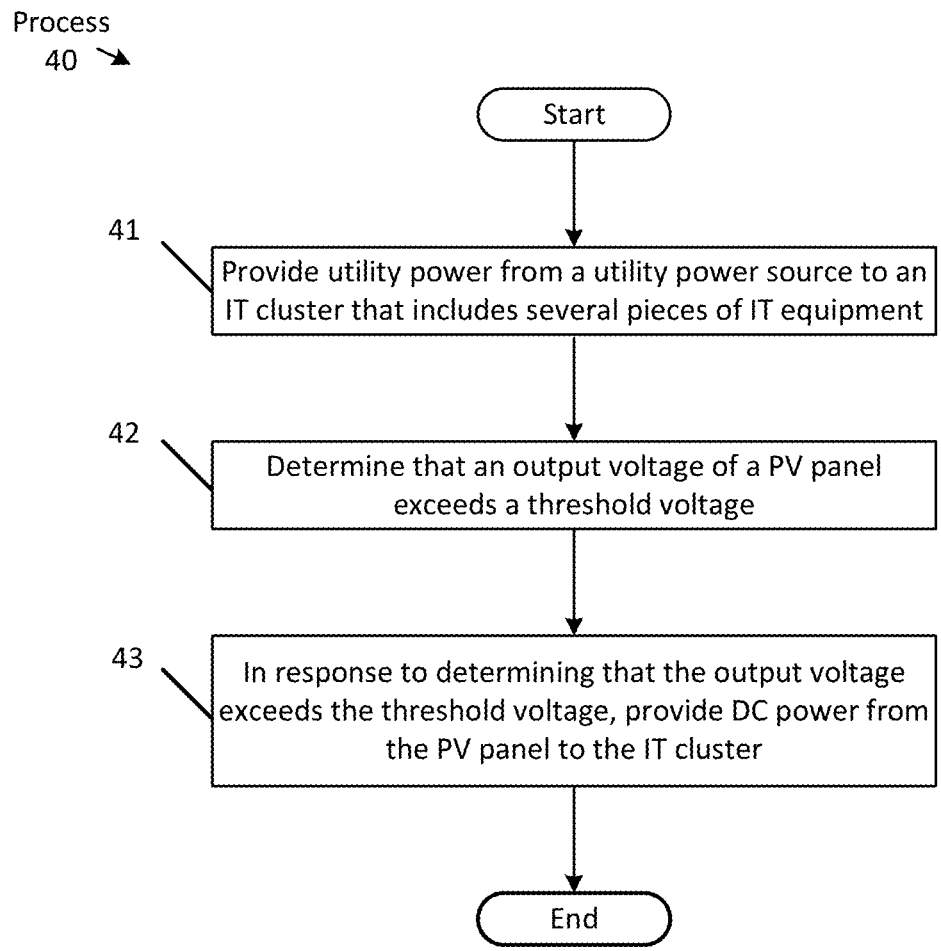
FIG. 5 is a flowchart of a process for providing DC power from a PV panel of a PV system when an output voltage of the PV panel exceeds a threshold voltage according to one embodiment.

FIG. 5 is a flowchart of a process 40 for providing DC power from a PV panel of a PV system when an output voltage of the PV panel exceeds a threshold voltage according to one embodiment. In one embodiment, the process 40 may be performed by the central controller 3. In another embodiment, at least some of the operations may be performed by other controllers, such as system controllers and/or PV controllers. In some embodiments, at least some of the operations in process 40 may be the same or similar to operations of process 50. The process 40 begins by the central controller providing utility power from a utility power source to an IT cluster that includes several pieces of IT equipment (at block 41). The central controller 3 determines that an output voltage of a PV panel (of a PV system) exceeds a threshold voltage (at block 42). The central controller then, in response to determining that the output voltage exceeds the threshold voltage, provides DC power from the PV panel to the IT (at block 43).

In one embodiment, the operations described in processes 50 and 40 of FIGS. 4 and 5, respectively, provide the IT power system 1 with the capability to switch from providing power from a utility power source to providing power from a renewable source, such as PV panels (e.g., and back again as needed). Thus, the controller may be configured to decouple the IT cluster from the utility power source and to couple the IT cluster to the PV system such that the IT cluster draws the DC power from the PV panel when an output voltage of the PV panel exceeds the threshold voltage. In another embodiment, the operations described herein may use the power produced by the PV panel to power one or more IT clusters in addition to power from one or more power sources, such as the utility power source, as described herein. In some embodiments, these operations may be performed in real-time, thereby allowing the system to dynamically switch between one or more sources (e.g., providing power from one or more sources) as needed.

Figure 6:
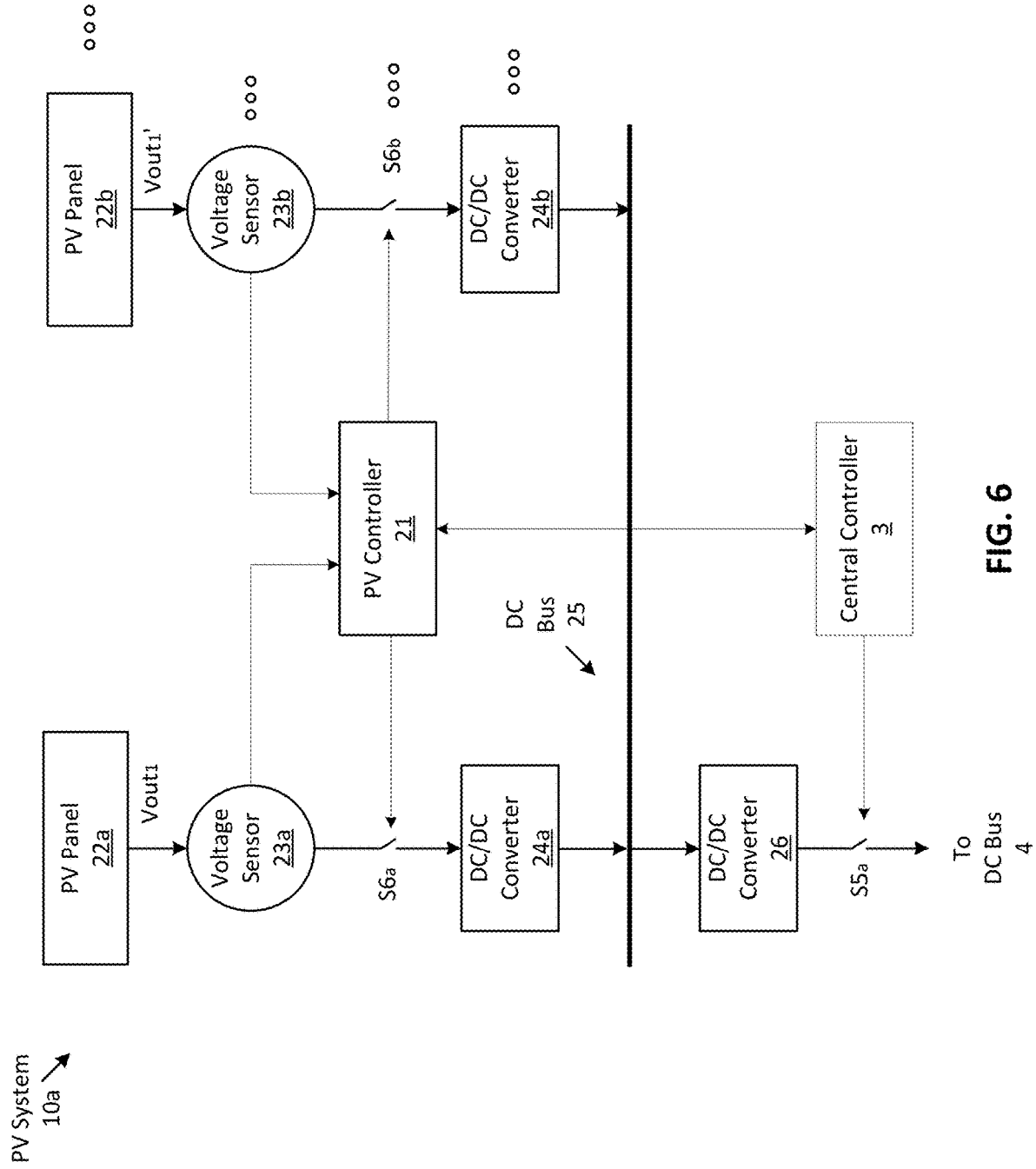
FIG. 6 is a block diagram illustrating an example of a PV system with several PV panels that are arranged to be coupled in parallel according to one embodiment.

FIG. 6 is a block diagram illustrating an example of a PV system with several PV panels that are arranged to be coupled in parallel according to one embodiment. This figure illustrates PV system 10a with several additional electronic components that are coupled to the DC bus 24. Specifically, the PV system 10a includes (at least) a PV panel 22b, a voltage sensor 23b, a DC-to-DC converter 24b, and a switch S6b. Each of these components are in a same arrangement as PV panel 22a, voltage sensor 23a, switch $S6_a$, and DC-to-DC converter 24a. Thus, the voltage sensor 23b is arranged to sense the output voltage $Vout_1'$ of PV panel 22b; and DC-to-DC converter 24b is coupled to the DC bus 25. Thus, both DC-to-DC converters 24a and 24b are coupled to the DC bus and are therefore in parallel to the DC-to-DC converter 26. In one embodiment, the output voltage of each of the DC-to-DC converts 24a and 24b is the same. In some embodiments, the converters 24a and 24b may be different and/or convert different input voltages to the output voltage. Specifically, this arrangement allows variances in the electronic components. For instance, both PV panels 22a and 22b may be rated differently, while their respective converters are configured to normalize the output voltages of the panels to a similar (or same) DC voltage across the DC bus 25.

In this configuration, the PV controller 21 is communicatively coupled to both switches $S6_a$ and $S6_b$ and both voltage sensors. In response to the PV controller 21 determining that both output voltages, $Vout_1$ and $Vout_1'$ exceed the threshold voltage, $S6_a$, $S6_b$, and $S5_a$ are closed. Having two PV panels 22a and 22b coupled in parallel provides additional (e.g., double the) DC power to the DC bus 4.

In one embodiment, the PV system 10a may configure which (or how many) PV panels are to be connected in parallel based on IT power system requirements. For instance, with the addition of PV panels, the overall power capabilities of the PV system 10a increases. With the changes in the PV system characteristics, the determined threshold voltage may be adjusted to account for the addition of PV panels. In another embodiment, the PV system may be configured to connect some of the PV panels (e.g., only 22a) in parallel, while leaving the others (e.g., 22b) decoupled. When more power is needed (e.g., IT clusters are requiring additional power), the PV system may connect more PV panels (e.g., both 22a and 22b) in parallel (e.g., by closing their corresponding switches, $S6_a$ and $S6_b$).

Figure 7:
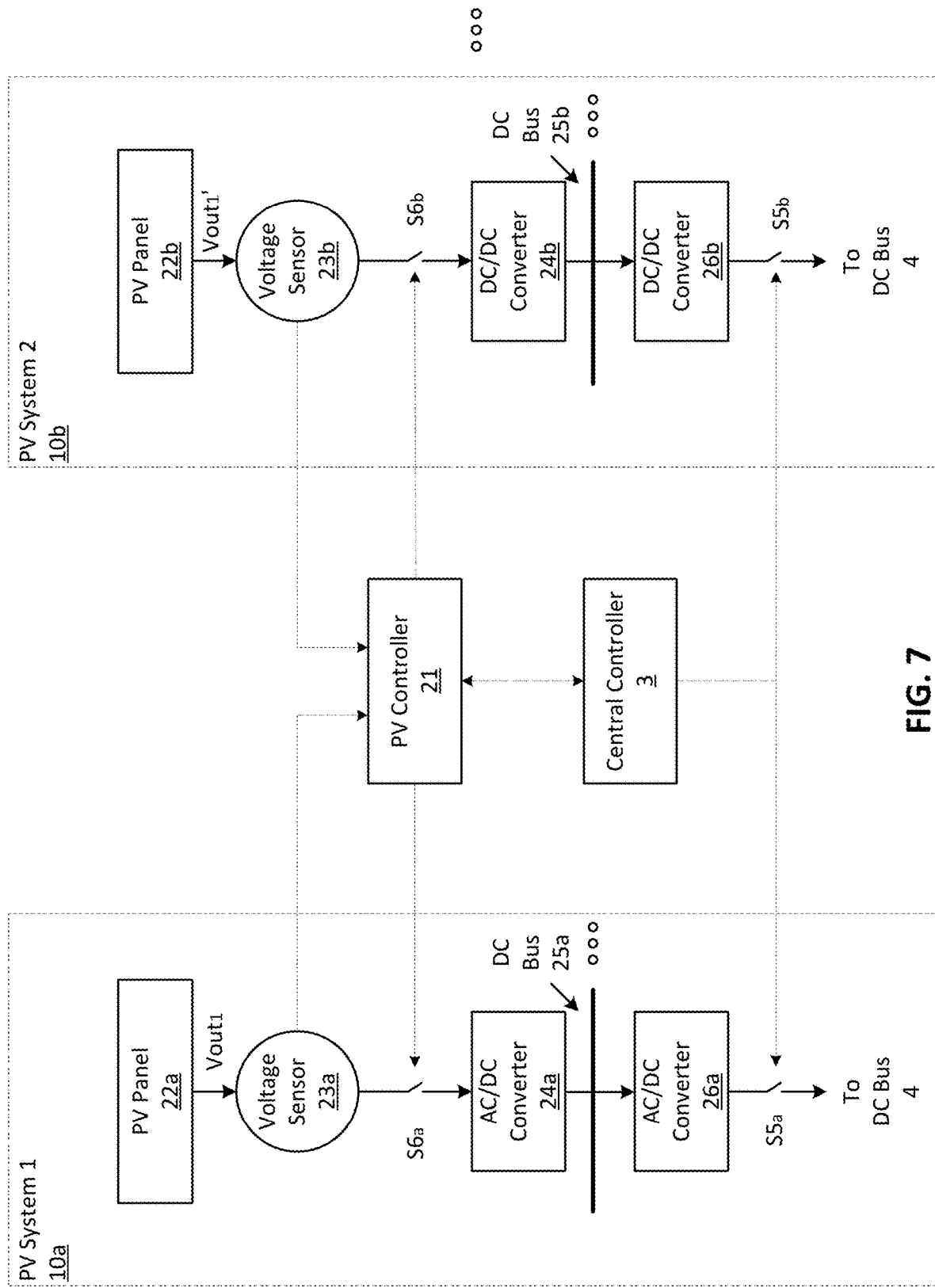
FIG. 7 is a block diagram illustrating an example of several PV systems that are arranged to be coupled in parallel according to one embodiment.

FIG. 7 is a block diagram illustrating an example of several PV systems that are arranged to be coupled in parallel according to one embodiment. Specifically, this figure illustrates two PV systems 10a and 10b that are configured to be coupled (and/or decoupled) to the DC bus 4. In one embodiment, each of the PV systems is a part of a separate IT power module, such that 10a is a part of module 2a and 10b is a part of module 2b. This figure also illustrates that each of the PV systems is controlled by one PV controller 21, rather than each of the PV systems having its own PV controller. In one embodiment, the PV controller 21 may independently control each of the PV systems based on whether the system's respective PV panel's output voltage (open-circuit voltage) exceeds the threshold voltage, as described herein. In another embodiment, each of the PV systems may include its own PV controller.

Figure 8:
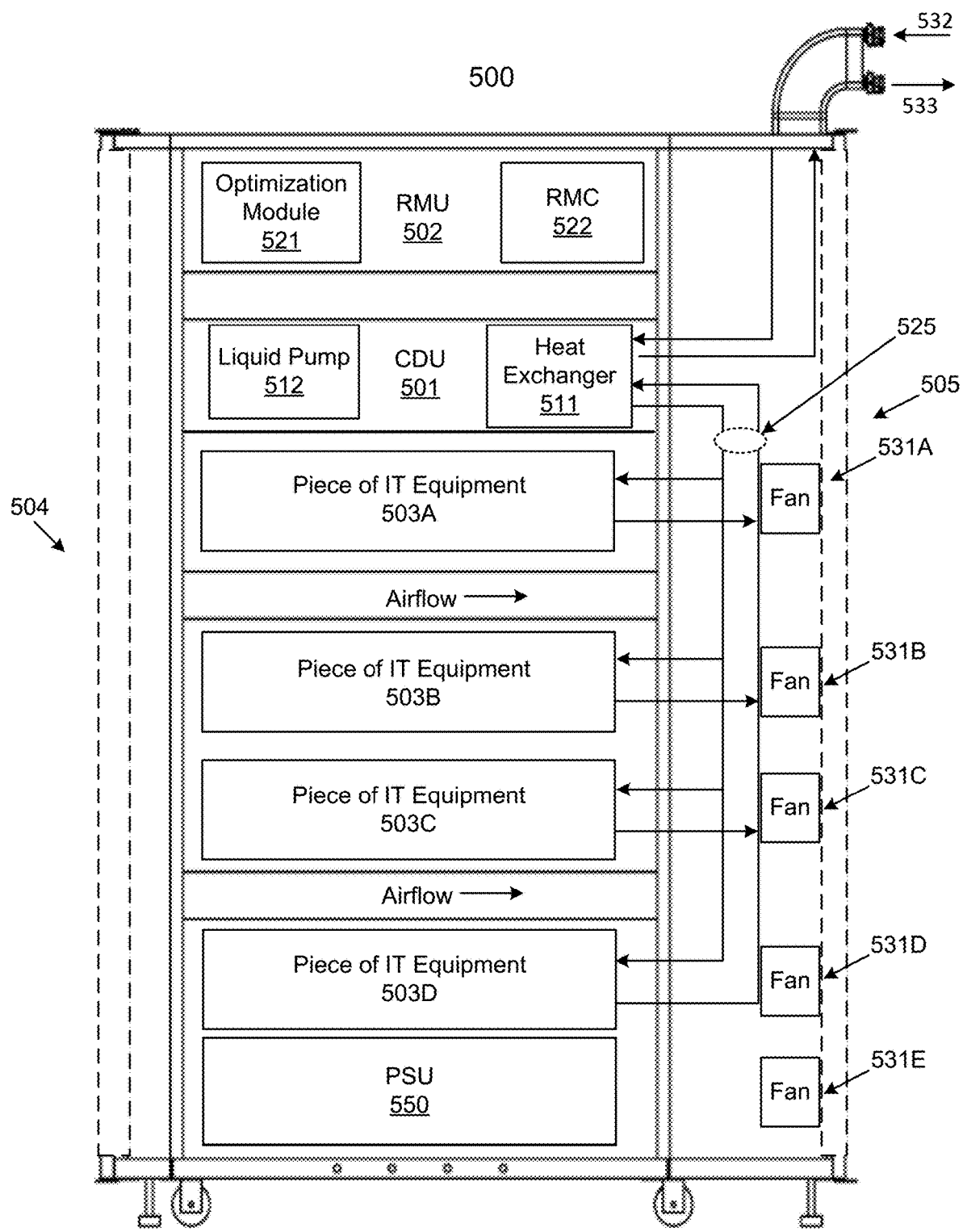
FIG. 8 is an example of an electronic rack according to one embodiment.

FIG. 8 is an example of an electronic rack according to one embodiment. Electronic rack 500 may include one or more server slots to contain one or more servers respectively. Each server includes one or more information technology (IT) components (e.g., processors, memory, storage devices, network interfaces). According to one embodiment, electronic rack 500 includes, but is not limited to, CDU 501, rack management unit (RMU) 502 (optional), a power supply unit (PSU) 550, and one or more pieces of IT equipment (or IT equipment) 503A-503D, which may be any type of IT equipment, such as server blades. The IT equipment 503 can be inserted into an array of server slots respectively from frontend 504 or backend 505 of electronic rack 500

Note that although there are only four pieces of IT equipment 503A-503D shown here, more or fewer pieces of IT equipment may be maintained within electronic rack 500. Also note that the particular positions of CDU 501, RMU 502, PSU 550, and IT equipment 503 are shown for the purpose of illustration only; other arrangements or configurations of these components. may also be implemented. Note that electronic rack 500 can be either open to the environment or partially contained by a rack container, as long as the cooling fans can generate airflows from the frontend to the backend (or generate airflows from the backend to the frontend).

In one embodiment, the rack 500 may include one or more electronic components of the IT power system 1. For instance, the rack 500 may include one or more IT clusters, such as IT cluster 8a, the utility power source 5a, the AC-to-DC converter 6a, the energy storage device 7a, the DC bus 4, the system controller 9a (e.g., as one of the pieces of IT equipment), and one or more of the switches.

In addition, a fan module can be associated with each of the pieces of IT equipment 503, and the PSU module. In this embodiment, fan modules 531A-531E, collectively referred to as fan modules 531, and are associated with the pieces of IT equipment 503A-503D and the PSU, respectively. Each of the fan modules 531 includes one or more cooling fans. Fan modules 531 may be mounted on the backends of IT equipment 503 to generate airflows flowing from frontend 504, traveling through the rack 500, and existing at backend 505 of electronic rack 900. In another embodiment, one or more of the fan modules may be positioned on the frontend 504 of the rack 500. Such frontend fans may be configured to push air into the mounted equipment.

In one embodiment, CDU 501 mainly includes heat exchanger 511, liquid pump 512, and a pump controller (not shown), and some other components such as a liquid reservoir, a power supply, monitoring sensors and so on. Heat exchanger 511 may be a liquid-to-liquid heat exchanger. Heat exchanger 511 includes a first loop with inlet and outlet ports having a first pair of liquid connectors coupled to external liquid supply/return lines 532-533 to form a primary loop. The connectors coupled to the external liquid supply/return lines 532-533 may be disposed or mounted on backend 505 of electronic rack 500. The liquid supply/return lines 532-533 are coupled to a set of room manifolds, which are coupled to an external heat removal system, or external cooling loop. In addition, heat exchanger 511 further includes a second loop with two ports having a second pair of liquid connectors coupled to liquid manifold 525 to form a secondary loop, which may include a supply manifold to supply cooling liquid to the pieces of IT equipment 503 and a return manifold to return warmer liquid back to CDU 501. Note that CDUs 501 can be any kind of CDUs commercially available or customized ones. Thus, the details of CDUs 501 will not be described herein.

Each of the pieces of IT equipment 503 may include one or more IT components (e.g., central processing units or CPUs, graphical processing units (GPUs), memory, and/or storage devices). Each IT component may perform data processing tasks, where the IT component may include software installed in a storage device, loaded into the memory, and executed by one or more processors to perform the data processing tasks. At least some of these IT components may be attached to the bottom of any of the cooling devices as described above. IT equipment 503 may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

Electronic rack 500 further includes optional RMU 502 configured to provide and manage power supplied to servers 503, fan modules 531, and CDU 501. Optimization module 521 and RMC 522 can communicate with a controller in some of the applications. RMU 502 may be coupled to PSU 550 to manage the power consumption of the PSU. The PSU 550 may include the necessary circuitry (e.g., an alternating current (AC) to direct current (DC) or DC to DC power converter, backup battery, transformer, or regulator, etc.) to provide power to the rest of the components of electronic rack 500.

In one embodiment, RMU 502 includes optimization module 521 and rack management controller (RMC) 522. RMC 522 may include a monitor to monitor operating status of various components within electronic rack 500, such as, for example, the pieces of IT equipment 503, CDU 501, and fan modules 531. Specifically, the monitor receives operating data from various sensors representing the operating environments of electronic rack 500. For example, the monitor may receive operating data representing temperatures of the processors, cooling liquid, and airflows, which may be captured and collected via various temperature sensors. The monitor may also receive data representing the fan power and pump power generated by the fan modules 531 and liquid pump 512, which may be proportional to their respective speeds. These operating data are referred to as real-time operating data. Note that the monitor may be implemented as a separate module within RMU 502.

Based on the operating data, optimization module 521 performs an optimization using a predetermined optimization function or optimization model to derive a set of optimal fan speeds for fan modules 531 and an optimal pump speed for liquid pump 512, such that the total power consumption of liquid pump 512 and fan modules 531 reaches minimum, while the operating data associated with liquid pump 512 and cooling fans of fan modules 531 are within their respective designed specifications. Once the optimal pump speed and optimal fan speeds have been determined, RMC 522 configures liquid pump 512 and cooling fans of fan modules 531 based on the optimal pump speed and fan speeds.

As an example, based on the optimal pump speed, RMC 522 communicates with a pump controller of CDU 501 to control the speed of liquid pump 512, which in turn controls a liquid flow rate of cooling liquid supplied to the liquid manifold 525 to be distributed to at least some of server blades 503. Therefore, the operating condition and the corresponding cooling device performance are adjusted. Similarly, based on the optimal fan speeds, RMC 522 communicates with each of the fan modules 531 to control the speed of each cooling fan of the fan modules 531, which in turn control the airflow rates of the fan modules 531. Note that each of fan modules 531 may be individually controlled with its specific optimal fan speed, and different fan modules and/or different cooling fans within the same fan module may have different optimal fan speeds.

Note that some or all of the IT equipment 503 (e.g., 503A, 503B, 503C, and/or 503D) may utilize different cooling methods. For instance, one server may utilize air cooling while another server may utilize liquid cooling. Alternatively, one IT component of a server may utilize air cooling while another IT component of the same server may utilize liquid cooling.

Figure 9:
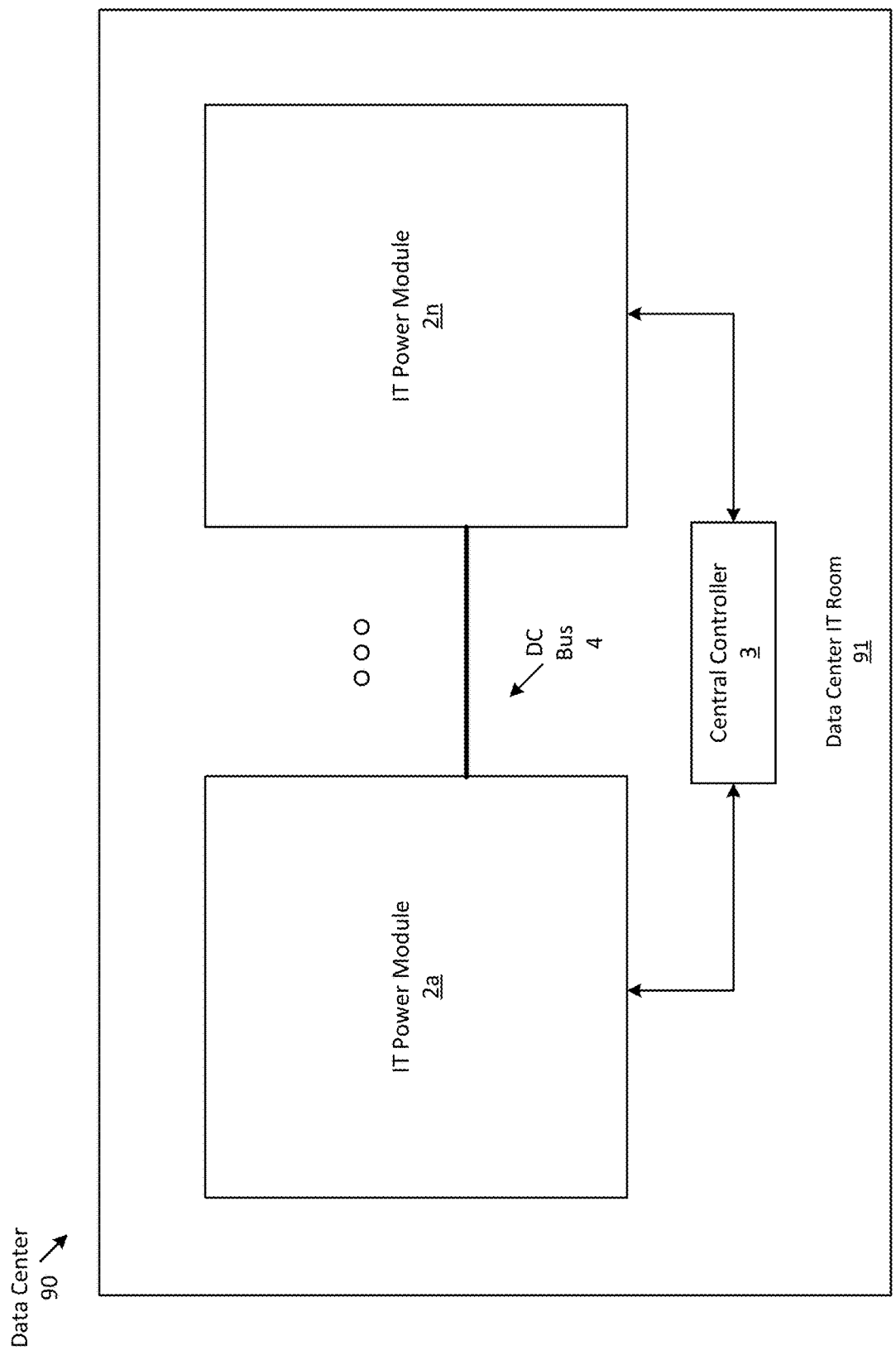
FIG. 9 is an example of a data center according to one embodiment.

FIG. 9 is an example of a data center 90 according to one embodiment. Specifically, this figure shows a data center 90 with at least one IT room 91 that includes the one or more IT power modules 2a-2n that are coupled together via the DC bus 4. In one embodiment, at least some of the electronic components of the modules may be positioned inside or outside the IT room. For instance, the PV panels of the modules may be positioned on a roof of the data center in order to capture solar radiation for power production.

In one embodiment, an embodiment of the disclosure may be (or include) a non-transitory machine-readable medium (such as microelectronic memory) having stored thereon instructions, which program one or more data processing components (generically referred to here as a "processor") to IT power system operations, such as operations performed by the central controller 3, the system controller 9a, and/or the PV controller 21. For example, the operations described herein to determine whether the configuration of the IT power module 2a should be adjusted based on whether the output voltage (e.g., open-circuit voltage) of the PV panel 21 exceeds a threshold voltage. In other embodiments, some of these operations might be performed by specific hardware components that contain hardwired logic. Those operations might alternatively be performed by any combination of programmed data processing components and fixed hardwired circuit components.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

While certain aspects have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. An information technology (IT) power system for a data center, the IT power system comprising:
    an IT cluster that includes a plurality of pieces of IT equipment, at least one of the pieces of IT equipment including one or more servers to provide data processing services, wherein the IT cluster is coupled to a utility power source and is configured to draw utility power from the utility power source and provide the utility power to the plurality of pieces of IT equipment;
    a photovoltaic (PV) system that includes a PV panel that is arranged to convert solar radiation into direct current (DC) power;
    a DC bus to which the PV system and the IT cluster are coupled;
    a first switch that is coupled between the utility power source and the IT cluster;
    a second switch that is coupled between the IT cluster and the DC bus, wherein the first switch is closed and the second switch is open, while the IT cluster draws utility power from the utility power source; and
    a controller that is configured to decouple the IT cluster from the utility power source and to couple the IT cluster to the PV system by opening the first switch and closing the second switch, such that the IT cluster draws the DC power from the PV panel when an output voltage of the PV panel exceeds a threshold voltage.

2. The IT power system of claim 1, wherein the PV system further comprises a voltage sensor that is coupled to the PV panel and a third switch that is coupled between the voltage sensor and the IT cluster, wherein the voltage sensor is arranged to sense the output voltage of the PV panel as an open-circuit voltage of the PV panel while the PV system is not coupled with any load when the third switch is open.

3. The IT power system of claim 2, wherein the PV system further comprises:
    a fourth switch that is coupled between the third switch and the IT cluster; and
    a DC-to-DC converter that is coupled between the third switch and the fourth switch and is configured to convert the output voltage of the PV panel into an output voltage of the DC-to-DC converter,
    wherein, in response to the output voltage of the PV panel exceeding the threshold voltage, the third switch and fourth switch are configured to close such that the output voltage of the DC-to-DC converter is input to the IT cluster.

4. The IT power system of claim 3, wherein the PV system further comprises a PV controller that is configured to
    receive the sensed output voltage of the PV panel from the voltage sensor, and
    in response to determining that the sensed output voltage of the PV panel exceeds the threshold voltage,
        close the third switch, and
        transmit a control signal to the controller indicating that the output voltage of the PV panel exceeds the threshold voltage,
    wherein the controller closes fourth switch in response to receiving the control signal from the PV controller.

5. The IT power system of claim 3, wherein the DC-to-DC converter is a first DC-to-DC converter, wherein the PV system further comprises a second DC-to-DC converter that is coupled between the third switch and the first DC-to-DC converter, wherein the second DC-to-DC converter is configured to convert the output voltage of the PV panel into an output voltage of the second DC-to-DC converter that is input to the first DC-to-DC converter and with which the first DC-to-DC converter is configured to convert into the output voltage of the first DC-to-DC converter.

6. The IT power system of claim 5, wherein the PV panel is a first PV panel and the voltage sensor is a first voltage sensor, wherein the PV system further comprises:
    a second PV panel;
    a second voltage sensor that is coupled to the second PV panel;
    a fifth switch that is coupled to the second voltage sensor, wherein the second voltage sensor is configured to sense an output voltage of the second PV panel as an open-circuit voltage while the second PV panel is not coupled with any load when the fifth switch is open;

a third DC-to-DC converter that is coupled to the fifth switch and is configured to convert the output voltage of the second PV panel into an output voltage of the third DC-to-DC converter; and a DC bus that couples the second and third DC-to-DC converters in parallel to the first DC-to-DC converter, wherein, in response to both open-circuit voltages of the first and second PV panels exceeding the threshold voltage, the third switch, the fourth switch, and the fifth switch are configured to close.

7. The IT power system of claim 5, wherein the PV system is a first PV system, wherein the IT power system further comprises:

a second PV system that has a same arrangement of components as the first PV system; and a DC bus that couples the first PV system and the second PV system in parallel to the IT cluster which is configured to draw DC power from either or both of the PV systems.

8. The IT power system of claim 1, wherein the PV system does not include a battery from which the IT cluster may draw stored DC power converted by the PV panel.

9. The IT power system of claim 1 further comprising:

a third switch that is coupled between the PV system and the DC bus, wherein the first switch is closed and the second and third switches are open while the IT cluster draws utility power from the utility power source, wherein the controller decouples the IT cluster from the utility power source and couples the IT cluster to the PV system by opening the first switch and closing the second and third switches.

10. A data center comprising:

a data center information technology (IT) room; and an IT power system that includes:

an IT cluster that includes a plurality of pieces of IT equipment, at least one of the pieces of IT equipment including one or more servers to provide data processing services, wherein the IT cluster is coupled to a utility power source and is configured to draw utility power from the utility power source and provide the drawn utility power to the plurality of pieces of IT equipment, a photovoltaic (PV) system that includes:

a PV panel that is arranged to convert solar radiation into direct current (DC) power;

a voltage sensor that is coupled to the PV panel and is arranged to sense an output voltage of the PV panel;

a direct current (DC)-to-DC converter that is coupled to the first switch and is configured to convert the output voltage of the PV panel into an output voltage of the DC-to-DC converter;

a first switch that is coupled between the voltage sensor and the DC-to-DC converter; and a second switch that is coupled between the DC-to-DC converter and the IT cluster, and a controller that is configured, in response to the output voltage of the PV panel exceeding a threshold voltage, to decouple the IT cluster from the utility power source and to couple the IT cluster to the PV system by closing the first switch and the second switch such that the output voltage of the DC-to-DC converter is input to the IT cluster.

11. The data center of claim 10, wherein the DC-to-DC converter is a first DC-to-DC converter, wherein the PV system includes a second DC-to-DC converter that is coupled between the first switch and the first DC-to-DC converter, wherein the second DC-to-DC converter is configured to convert the output voltage of the PV panel into an output voltage of the second DC-to-DC converter that is input to the first DC-to-DC converter and with which the first DC-to-DC converter is configured to convert into the output voltage of the first DC-to-DC converter.

12. The data center of claim 11, wherein the PV panel is a first PV panel and the voltage sensor is a first voltage sensor, wherein the PV system includes a second PV panel;

a second voltage sensor that is coupled to the second PV panel;

a third switch that is coupled to the second voltage sensor, wherein the second voltage sensor is configured to sense an output voltage of the second PV panel as an open-circuit voltage while the second PV panel is not coupled with any load when the third switch is open;

a third DC-to-DC converter that is coupled to the third switch and is configured to convert the output voltage of the second PV panel into an output voltage of the third DC-to-DC converter; and a DC bus that couples the second and third DC-to-DC converters in parallel to the first DC-to-DC converter, wherein, in response to both open-circuit voltages of the first and second PV panels exceeding the threshold voltage, the first switch, the second switch, and the third switch are configured to close.

13. The data center of claim 11, wherein the PV system is a first PV system, wherein the IT power system comprises a second PV system that has a same arrangement of components as the first PV system; and a DC bus that couples the first PV system and the second PV system in parallel to the IT cluster which is configured to draw DC power from either or both of the PV systems.

14. The data center of claim 10, wherein the PV system does not include a battery from which the IT cluster may draw stored DC power converted by the PV panel.

15. A method performed by a programmed processor of an Information Technology (IT) power system for a data center, the IT power system including a photovoltaic (PV) system that has a PV panel that is arranged to convert solar radiation into direct current (DC) power, the method comprising:

providing utility power from a utility power source to an IT cluster that includes a plurality of pieces of IT equipment;

determining that an output voltage of the PV panel exceeds a threshold voltage, wherein the IT power system comprises 1) DC bus to which the PV system and the IT cluster are coupled, 2) a first switch that is coupled between the utility power source and the IT cluster, and 3) a second switch that is coupled between the IT cluster and the DC bus; and in response to determining that the output voltage exceeds the threshold voltage, providing the DC power from the PV panel by opening the first switch and closing the second switch.

16. The method of claim 15 further comprising determining the threshold voltage based on PV system characteristics and IT cluster characteristics.

17. The method of claim 15, wherein the PV system has a voltage sensor that is coupled to the PV panel and a switch that is coupled between the voltage sensor and the IT cluster, wherein the method further comprises receiving, from the voltage sensor, a measurement of the output voltage as an open-circuit voltage of the PV panel while the PV system is not coupled with any load when the switch is open.

18. The method of claim 17, wherein the IT power system has 1) a second switch that is coupled between the utility power source and the IT cluster and 2) a third switch that is coupled between the PV system and the IT cluster, wherein providing the DC power comprises closing the first switch and the third switch while the second switch is open.

* * * * *